April 30, 1935.  T. R. LOFLAND  1,999,938
SUPPORTING APPARATUS
Filed Feb. 27, 1934   4 Sheets-Sheet 1
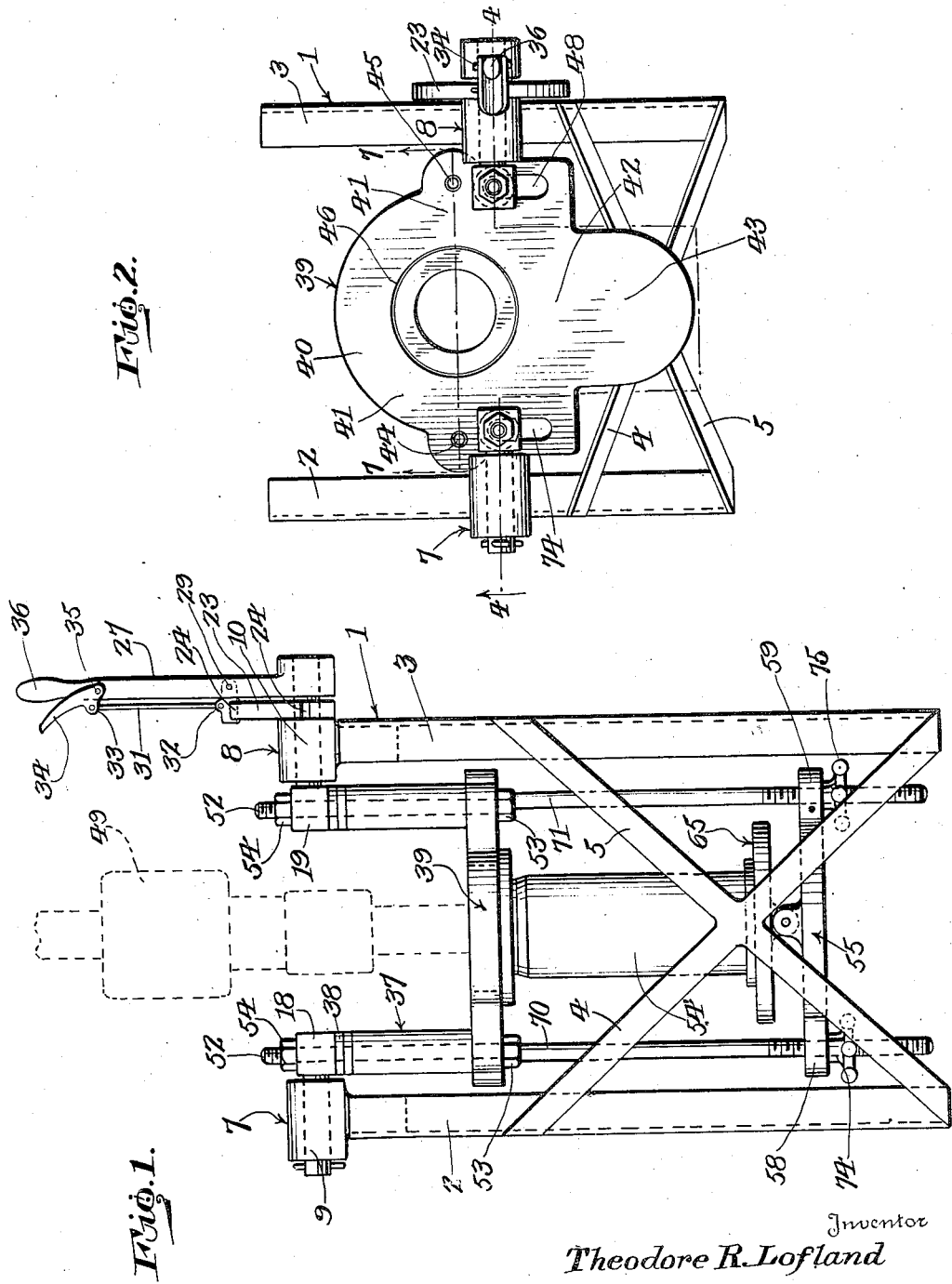
Inventor
Theodore R. Lofland
By Geo. P. Kimmel
Attorney

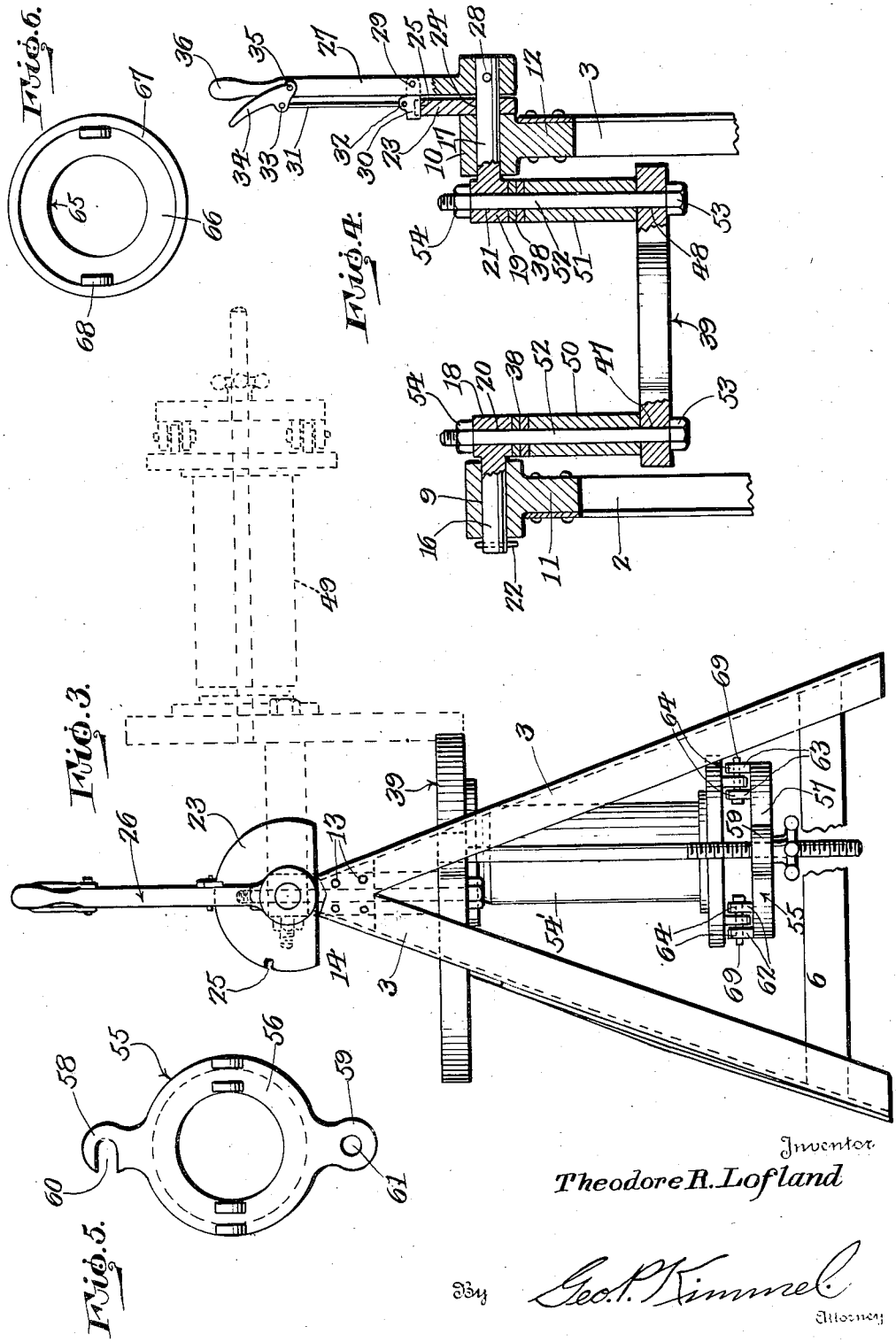

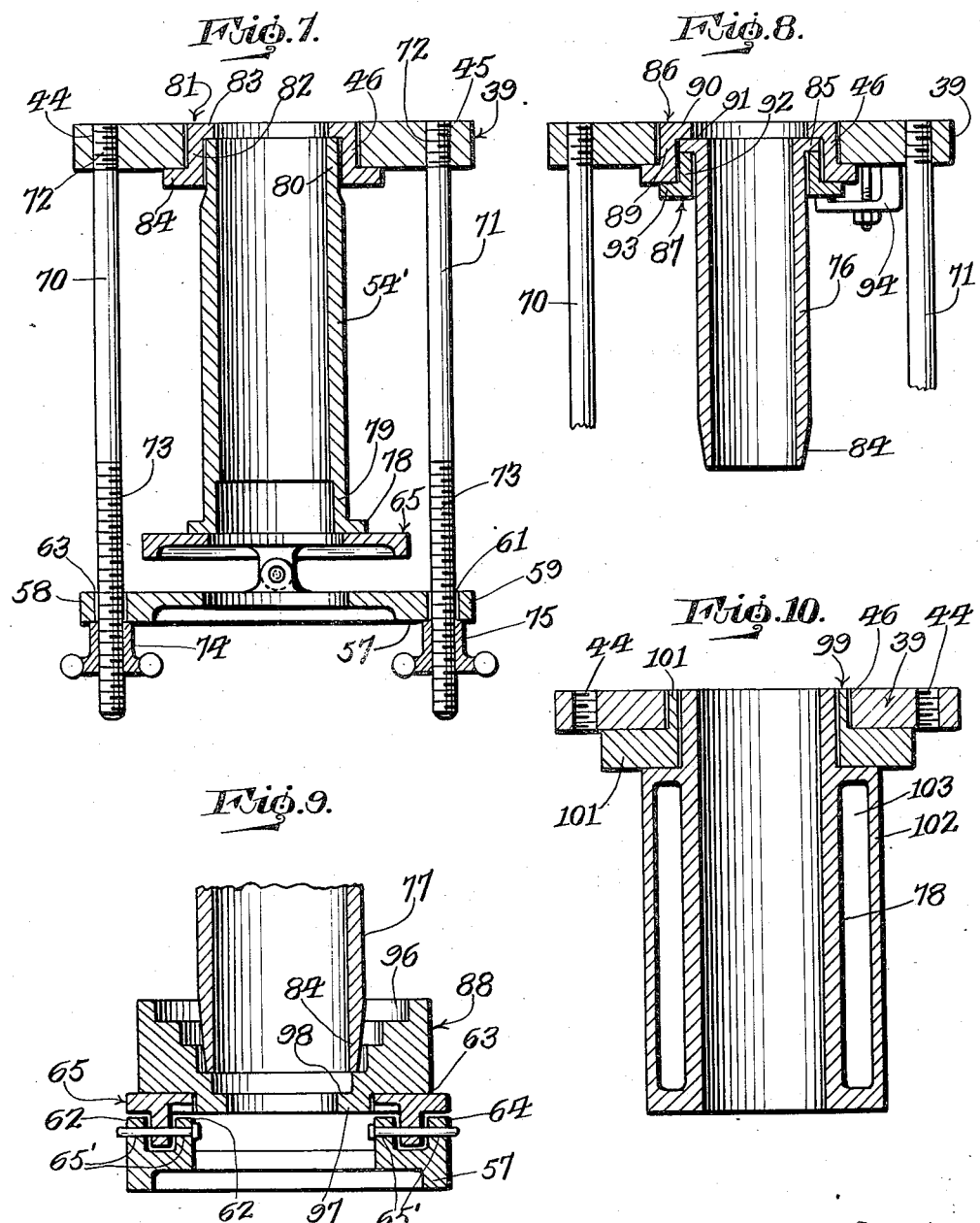

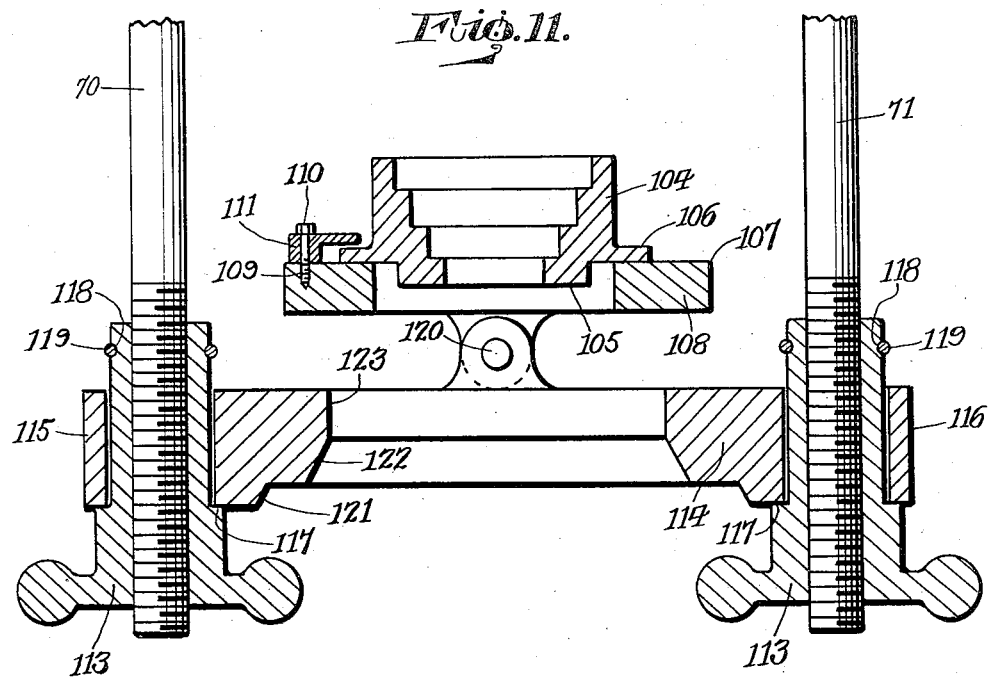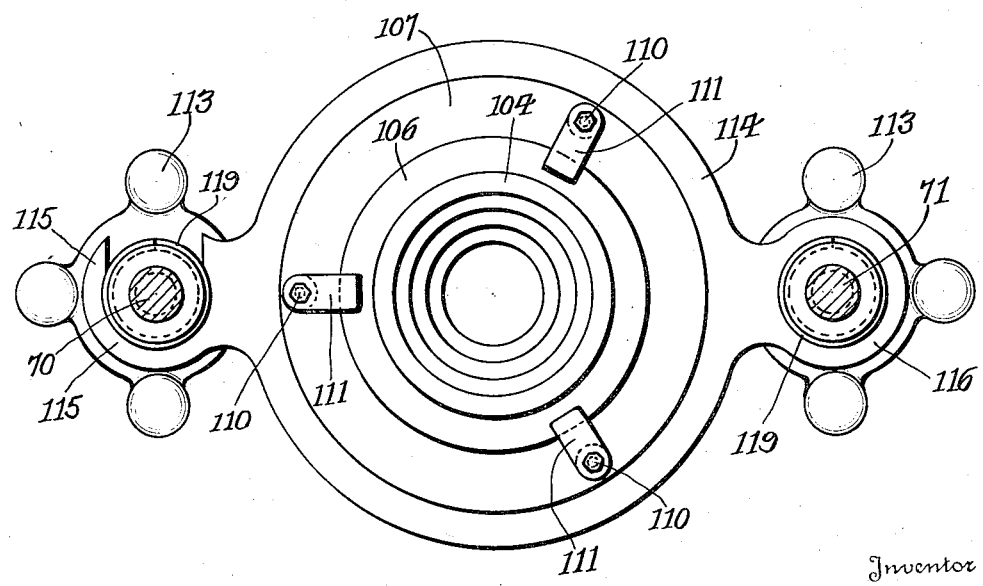

Patented Apr. 30, 1935

1,999,938

UNITED STATES PATENT OFFICE 1,999,938

SUPPORTING APPARATUS

Theodore R. Lofland, Liberal, Kans.

Application February 27, 1934, Serial No. 713,132

11 Claims. (Cl. 77—63)

This invention relates to a supporting apparatus, and has for its object to provide, in a manner as hereinafter set forth, an apparatus of the class referred to for supporting, in fixed relation relatively to each other, a sleeve of a motor cylinder and a boring machine whereby the latter, when operated, will function to rebore the supported sleeve.

The invention further aims to provide, in a manner as hereinafter set forth, an apparatus of the class referred to for supporting in fixed relation relatively to each other a sleeve of a motor cylinder and a boring machine, whereby the latter, when operated, will function to rebore the supported sleeve, and with the apparatus including means for disposing the machine and sleeve in endwise opposed fixed relation vertically and at various angles with respect to the vertical median of the apparatus.

A further object of the invention is to provide, in a manner as hereinafter set forth, an apparatus of the class referred to for suspending in fixed relation relatively to each other, a boring machine and cylinder sleeves of varying diameters and lengths whereby when the machine is operated it will function to rebore the suspended cylinder.

A further object of the invention is to provide, in a manner as hereinafter set forth, an apparatus for the purpose set forth including means whereby cylinder sleeves of varying diameters and lengths may be suspended thereby in a position to be rebored.

A further object of the invention is to provide, in a manner as hereinafter set forth, an apparatus of the class referred to including means for supporting a cylinder sleeve to be rebored and with such means acting to prevent the cylinder from shifting or moving during the reboring operation.

A further object of the invention is to provide, in a manner as hereinafter set forth, an apparatus of the class referred to for supporting and suspending a cylinder sleeve to be rebored and for centering the sleeve relative to a boring tool, as well as for maintaining the sleeve in such centering position during the reboring thereof, thereby preventing the sleeve from being bored on an angle or variation from its true perpendicular alignment and off-center.

A further object of the invention is to provide, in a manner as hereinafter set forth, an apparatus of the class referred to for supporting in fixed relation relatively to each other and for tilting in unison in a like plane, a boring machine and a cylinder sleeve, and with the machine and sleeve, when supported in their initial positions, being disposed within the apparatus in a manner to simplify the tilting thereof and to overcome the employment of a counterbalance in connection therewith, and which is accomplished by having an approximate balance of the parts of the apparatus to which the boring machine and sleeve are connected and bodily shifted together.

A further object of the invention is to provide, in a manner as hereinafter set forth, an apparatus of the class referred to including adjustable means for anchoring the sleeve stationary to the apparatus, and with such means being adaptable for use for cylinder sleeves of varying lengths, as well as functioning to make an unusually rigid, permanent, durable and the necessary perfect alignment of the cylinder relative to a boring element.

A further object of the invention is to provide, in a manner as hereinafter set forth, an apparatus for the purpose referred to so constructed and arranged to insure for the quick and perfect boring of cylinder sleeves regardless of their size and form.

Further objects of the invention are to provide, in a manner as hereinafter set forth, an apparatus of the class referred to, which is comparatively simple in its construction and arrangement, strong, durable, compact, thoroughly efficient when used, conveniently adjusted, readily assembled, and comparatively inexpensive to manufacture.

To the above ends essentially and to others which may hereinafter appear, the invention consists of such parts, and such combination of parts, which fall within the scope of the invention as claimed.

In the drawings:

Figure 1 is a front elevation of the apparatus, showing a sleeve supported thereby and further illustrating, in dotted lines, a boring machine in endwise opposed relation with respect to the sleeve, Figure 2 is a top plan view of the apparatus, Figure 3 is a side elevation of the apparatus, showing a sleeve supported thereby, and in dotted lines, a boring machine in endwise opposed relation with respect to the sleeve, and further illustrating, in dotted lines, the sleeve and machine being tilted from vertical to horizontal position.

Figure 4 is a fragmentary sectional view of the apparatus taken on line 4—4 Figure 2, Figure 5 is a top plan view of the clamp plate, Figure 6 is a top plan view of the self-aligning clamp plate, Figure 7 is a fragmentary view in section on line 7—7 Figure 2, illustrating a sleeve clamped in position with its flanged end seated on the self-aligning clamp plate of the apparatus, Figure 8 is a fragmentary view in vertical section illustrating a sleeve having its flanged end coupled with the face plate of the apparatus, Figure 9 is a fragmentary view in vertical section showing the adaptation with respect to a sleeve of the internally stepped member of the apparatus, and Figure 10 is a fragmentary view in vertical section showing a cylinder block positioned relatively to the face plate of the apparatus.

Figure 11 is a top plan view illustrating a modified form of internally stepped member, self-aligning clamping plate, adjustable clamping plate and adjusters for the latter.

Figure 12 is a vertical sectional view of the assemblage of the modified elements shown in Figure 11.

The apparatus includes a cast iron rigid, strong base structure or body part generally indicated at 1 and constructed in a manner to permit easy sweeping and cleaning of the floor upon which it is supported. The structure 1 is formed of a pair of upstanding spaced supports 2, 3 coupled together at the front thereof by an integral cross piece having an upper and a lower pair of oppositely extending inclined arms 4, 5. The ends of said arms are anchored to the bottoms and below the tops of the supports. Each support consists of a pair of oppositely inclined side members integral at their upper ends with each other and which are coupled together above their lower ends by an integral brace member 6. Arranged at the upper ends of the supports 2, 3 are bearing elements 7, 8 respectively provided with tubular portions 9, 10 respectively and depending shanks 11, 12 respectively (Figure 4). The tubular portions 9, 10 of the elements 7, 8 respectively extend inwardly and outwardly with respect to the upper ends of the supports 2, 3 respectively. The shanks 11, 12 are arranged within the upper portions of the supports 2, 3 respectively. The shanks 11, 12 are anchored to the supports 2, 3 respectively in any suitable manner, preferably by the holdfast means 13.

With reference to Figure 4: Journaled in the tubular portions 9, 10 are oppositely disposed shafts 16, 17 respectively, having their inner ends formed with squared heads 18, 19 respectively, formed with openings 20, 21 respectively. The shaft 16 is of less length than shaft 17 and carries in proximity to its outer end a stop pin 22. Fixed to the outer end of the tubular portion 10 of bearing element 8 is a notched plate 23 formed with an opening 24 for the passage of shaft 17. The notches in plate 23 are indicated at 25. Co-acting with the notches of plate 23 is a latching mechanism 26 for the purpose of retaining a sleeve and a boring machine, arranged in endwise opposed relation, vertically interiorly within and horizontally exteriorly of body part 1 (Figure 3).

The latching mechanism 26 consists of a lever 27 which is fixed at its inner end, as at 28 upon shaft 17, exteriorly of plate 23. Pivotally attached as at 29 to lever 27 is an inwardly extending dog or pawl 30 for selectively seating into one of the notches 25. A link or pull member 31 has its inner end pivotally connected as at 32 to dog 30 and its other end pivotally connected as at 30 to a shifting lever 34. The latter is pivotally connected as at 35 to the lever 27 adjacent the handle 36 at the outer end of the latter. The lever 27 provides means for turning shaft 17 when dog 30 is clear of the notches 25 in plate 23.

With reference to Figures 1, 2 and 3, the apparatus includes a carrier which is coupled to shafts 16, 17 in a manner whereby both shafts will move in unison and bodily carry the carrier therewith when shaft 17 is turned clockwise or counterclockwise. The carrier indicated at 37 is set up in a manner whereby its length may be increased or decreased when desired. Shims or washers 38 are provided for this purpose and will be hereinafter referred to. The carrier 37 includes a face or supporting plate 39 formed of a semi-circular stretch 40, an oval-shaped stretch 41, a rectangular stretch 42 and a semi-oval shaped stretch 43. The stretch 40 at its end of greater width merges into the stretch 41. The stretch 40 is of greater length and of less width than part 41. The latter extends beyond each side of stretch 40. The stretch 41 merges into the stretch 42. The latter is of greater width and of less length than stretch 41 and has its sides arranged inwardly with respect to the sides of stretch 41. The stretch 43 is of greater length and of less width than any of the other stretches, merges into and is disposed concentrically with respect to stretch 42. The plate 39 is formed with a pair of spaced parallel openings 44, 45 arranged in proximity to the side edges of part 41; a circular opening 46 extended across stretch 41 and into a portion of stretches 40 and 42; and a pair of spaced parallel slots 47, 48 arranged in proximity to the side edges of stretch 42, spaced from the openings 44, 45 respectively, having a part of the opening 46 arranged therebetween in spaced relation, and disposed parallel to the axis of opening 46. The opening 46 is for the passage of a boring element of the boring machine 49. The machine 49 is adapted to be clamped upon the stretches 42 and 43 of plate 39.

With reference to Figures 1, 2, 3 and 4, more particularly to Figure 4, the carrier 37 also includes a pair of tubular positioning members 50, 51 coacting with the shims, spaces or washers 38 for the plate 39. One end of the members 50, 51 abuts the upper face of plate 37 and registers with a portion of the slots 47, 48 respectively. The other end of members 50, 51 has the shims 38 mounted thereon. Extending through the openings 20, 21, shims 38, members 50, 51 and slots 47, 48 are headed bolts 52 having their heads 53 abutting the lower face of plate 39. The bolts 52 extend above the heads 18, 19 and carry clamping nuts 54. These latter abut the heads 18, 19 and in connection with the heads 18, 19, 53, shims 38, members 50, 51 and lower face of plate 39 maintain the latter in spaced relation with respect to the shafts 16, 17. The distance which plate 39 is spaced from the shafts 16, 17 may be varied by increasing or decreasing the number of shims 38 interposed between the members 50, 51 and the heads 18, 19 respectively whereby the length of the carrier may be increased or decreased. The structure referred to provides for supporting and suspending the machine 49 within and below the upper end of the body part 1.

With reference to Figures 1, 3, 5, 6, 7 and 8, more particularly to Figures 1, 5 and 6, the apparatus includes a clamping mechanism functioning to clamp the sleeve 54' to the carrier 37 in fixed relation thereto whereby the sleeve will be bodily movable with the carrier 37 when the latter is shifted from and to its vertical position with respect to body part 1. The said mechanism includes a bodily adjustable clamping plate 55 having its body part 56 in the form of an annulus provided with a depending annular flange 57 flush with its outer edge. The body part 56 at diametrically opposite points has its outer edge formed with a pair of oppositely extending radially disposed ears 58, 59, the former being provided with a transverse slot 60 opening at one side edge thereof, and the other with an opening 61. The upper face of body part 56 at diametrically opposite points and at right angles to the ears 58, 59 is formed with two pairs of vertically disposed apertured lugs. The lugs of each pair are arranged in parallel spaced relation. The apertures of the lugs of each pair are arranged in alignment. The lugs of one pair are designated 62, and the lugs of the other pair 63. The aperture in each lug is indicated at 64.

With reference to Figures 1, 3, 7 and 9, the sleeve clamping mechanism further includes a self-aligning clamping plate 65 consisting of a body part 66 in the form of an annulus provided with a depending annular flange 67 flush with its outer edge. Integral with the inner face of flange 67 and lower face of body part 66 is a pair of depending apertured lugs 68 disposed at diametrically opposite points with respect to said body part. The diameter of the latter is the same as that of body part 56. The said body parts are arranged in superposed spaced relation. One of the lugs 68 extends between a pair of lugs 62 and the other lug 68 extends between the pair of lugs 63. The lugs 69 are pivotally connected to the lugs 62, 63, as at 65' whereby plate 65 is pivotally supported upon plate 55.

With reference to Figures 1, 3, 7 and 8, more particularly to Figure 7, the clamping mechanism further includes a pair of connecting bars 70, 71 between the plates 39 and 55. The said bars at their upper ends threadedly engage with the wall of openings 44, 45 in plate 39, as at 72 and have their lower portions threaded, as at 73. The plate 55 is positioned upon the bars 70, 71 and is lengthwise adjustable with respect thereto. The bar 70 extends through slot 60 in ear 58. The bar 71 passes through opening 61 in ear 59. Carried by the lower ends of bars 70, 71, as well as threadedly engaging with the threaded portions 73 are manually operated adjusters 74, 75 respectively for the plate 55. The adjusters function to retain the plate 55 at the desired point upon rods 70, 71, as well as supporting and anchoring plate 55 in its adjusted position.

The apparatus includes centering means for sleeves of different types designated 54', 76, 77 and a single engine block 78. The sleeve 54' is formed at one end with an outwardly directed annular flange 78 and is provided at its flanged end with a reduced terminal portion 79 of greater inner diameter than the remaining part thereof. The sleeve 54' at its other end has a reduced terminal portion 80 of smaller outer diameter than the remaining part thereof. With reference to Figure 7, the centering means for sleeve 54', which also provides an abutment for the latter is indicated at 81 and consists of a body part 82 in the form of an annulus for positioning in opening 46 of plate 39. Extending inwardly from the top and outwardly from the bottom of body part 82 are annular flanges 83, 84 respectively. The body part 82 is of a height greater than the thickness of plate 39 and depends from the latter. The flanges are disposed at right angles to body part 82. The flange 84 is arranged to abut the lower face of plate 39 when the element 81 is in its sleeve centering position. The reduced portion 80 of sleeve 54' is to extend into body part 82 to abut the lower face of flange 83. The flanged end of sleeve 54' is to seat upon element 65. When the adjusters 74, 75 are shifted to the desired position upon bars 70, 71 the sleeve 54' is fixedly clamped to the carrier as shown in Figure 7.

With reference to Figures 8 and 9, the sleeve 76 or 77 has a peripherally tapered end portion 84 and an outwardly directed annular flange 85 at its other end. The flange 85 is shown only with respect to sleeve 76. The centering means for sleeve 76 or 77 comprises a pair of superposed upper members 86, 87 and a lower stepped member 88. The member 86 consists of a body part 89 in the form of an annulus provided at its top and bottom with inwardly and outwardly directed annular flanges 90, 91 respectively. The member 86 is arranged relatively to plate 39 and constructed in the same manner as the centering means 81. The member 87 comprises a body part 92 in the form of an annulus and provided at its bottom with an outwardly directed annular flange 93. The member 87 has its body part extended into member 86 in a manner whereby the top edge of body part 92 will oppose the lower face of flange 90. The flange 93 is to abut the lower face of flange 91. When sleeve 76 or 77 is arranged in position to be acted upon by the boring machine, the flange 78 is interposed and clamped between the top edge of member 87 and the lower face of flange 90 (Figure 8). For clamping sleeve 76 or 77 in the manner as stated, an adjustable clamping device 94 is carried by and depends from plate 39. The device 94 coacts with flange 93. The member 88 (Figure 9) comprises a body part 95 in the form of an annulus having its faced formed with a series of spaced shoulders 96 progressively increasing in diameter upwardly for selectively supporting sleeves of different diameters. The bottom of member 88 is formed with a depending collar 97 of an outer diameter less than the outer diameter of body part 95, and of an inner diameter less than that part of smallest inner diameter of body part 95. The collar 97 forms a shoulder 98 at the lower end of said series of shoulders 96. The member 88 seats upon and the collar 97 depends into the body part 66 of plate 65.

With reference to Figure 10, the centering means for the single engine block 78 is indicated at 99 and consists of a body part 100 in the form of an annulus provided at its lower end with an outwardly directed annular flange 101 of materially greater thickness than that of body part 100. The latter is to extend into opening 46 and flange 101 is to abut the lower face of plate 39. The block 78 is to extend into body part 100 and the top of that portion 102 of block 78 which provides the water circulating passage 103 is to abut the lower face of flange 101. The block 78 is to be seated upon plate 65 and clamped between the latter and flange 101.

With reference to Figures 11 and 12, a modified form of stepped member 104 is shown and which is constructed similar to member 88 with this exception that directly above the depending collar 105 of member 104, the latter is provided with a laterally extended annular flange 106 which extends upon the self-adjusting clamping plate 107. The latter differs from plate 65 in this respect, as it has its annular body 108 of uniform thickness and formed with threaded sockets 109 in proximity to its outer edge. Threadedly engaging in sockets 109 are headed bolts 110 carrying locking lugs 111 for overlapping flange 106. The purpose of lug 111 is to fasten member 104, so that it will not fall out when the sleeve is being adjusted relative to plate 39. When the sleeve is assembled with respect to plate 39, one man in placing the rings or adapters at both ends of the sleeve, often in his hurry in adjusting and tilting the machine, cannot handle all of the rings and adapters in connection with handling the sleeve and placing it in position, and it has been found that in placing the rings or adapters around the sleeve at the adjustable clamping plate, when the latter is swiveled in and out of position around the threaded adjustable bars 70 and 71, that a lock lug is needed to help hold these rings or adapters in position and the lug is adjusted so that the adapters will work freely and seat themselves or automatically go in place, as the lug merely acts as a guide to temporarily hold the position. There is shown in Figures 11 and 12 a pair of tubular adjusters 113 for the clamping plate 114. The adjusters 113 are different from the adjusters 74, 75 in this respect that they extend upwardly through slotted ear 115 and apertured ear 116 on plate 114 and are formed with peripheral shoulders 117 intermediate their ends which abut the lower faces of ears 115, 116. The adjusters 113 are of greater length than adjusters 74, 75. The adjusters 113 are internally threaded for adjustable engagement with the threads of the bars 70, 71. The upper portion of the adjusters 113 have peripheral grooves 118 in which are mounted snap rings 119 which prevent the ears 115, 116 from riding on the bars 70, 71. As the adjusters carry plate 55 it prevents the latter from jimmying the threads on the bars in placing and removing a sleeve. The plate 107 is pivotally connected, as at 120 to plate 114 in the same manner as plate 65 is connected to plate 55. The plate 114 is of annular form and has its inner edge formed of different diameters as indicated at 121, 122 and 123.

The object of tilting the boring machine to and from the positions as shown and the object of the adjustments on the stand for higher or lower elevations are to permit the easy operation for the workman and to clean out grease and rust, and to make it easier to handle the adapters to keep it in line and to insert and remove the sleeves according to the desired height that the workman needs for his machine and the sleeve to be used. As these boring machines will weigh from 135 to 150 pounds and are of various types that necessarily have to be assembled on the slotted plate in various positions to create an easy working counterbalance by reason of the difference in weight and the difference in position that they have to be fastened and it must be realized that in operating this tilted boring machine on the stand all day by a workman, that it becomes very tiresome unless the counterbalance is so centered that it will be easy to operate, so that the means of operating the carrier of a boring machine either in the vertical, horizontal or perpendicular position, the boring machine has been fastened on the stand in such a manner that the weight is equally balanced as nearly as possible to make the operation easy on the man who has this work to do and which is accomplished by the apparatus as herein described.

What I claim is:—

1. A supporting apparatus for reboring the interior of a tubular structure comprising a vertical base having an open top, a yoke-shaped carrier common to a boring machine and the work to be operated upon and adapted to have said machine coupled to the closed end thereof for bodily moving therewith, said carrier being rotatably suspended at its open end from the top of and within said base, the other end of said carrier being in the form of a plate to which said machine is adapted to be secured, said plate having an opening for the passage of the boring element of the machine, a structure mounted in and extended from said plate in an opposite direction with respect to said machine and including a self aligning part coacting with the other parts thereof for centering the work to be operated upon and for clamping the work to the carrier, means connected with the open end of and for shifting the carrier with the machine and work secured thereto from a position within the base to a position to extend outwardly at an angle with respect to the base, and means for latching the carrier in said positions.

2. A supporting apparatus for reboring the interior of a tubular structure comprising a vertical base having an open top, a yoke-shaped carrier common to a boring machine and the work to be operated upon and adapted to have said machine coupled to the closed end thereof for bodily moving therewith, said carrier being rotatably suspended at its open end from the top of and within said base, the other end of said carrier being in the form of a plate to which said machine is adapted to be secured, said plate having an opening for the passage of the boring element of the machine, means mounted in and extended from said plate in an opposite direction with respect to said machine for centering the work to be operated upon and for clamping the work to the carrier, means for shifting the carrier with the machine and work secured thereto from a position within the base to a position to extend outwardly at an angle with respect to the base, means for latching the carrier in said positions, and the said centering and clamping means including a clamping plate adjustable relatively to the carrier and a self-aligning work clamping element pivotally carried by said clamping plate.

3. In a supporting apparatus for the purpose set forth, a boring machine and a tubular work carrier of yoke-shape form, means for adjustably suspending the carrier from its open end, annular centering means for the work mounted in the carrier, a work clamping means secured at its inner end to the other end of and extended from the carrier and including at its outer end a clamping plate adjustable relative to the carrier and a self-aligning work clamping plate interposed between the adjustable plate and the carrier and pivotally supported upon said adjustable plate, and means for latching the carrier in adjusted position.

4. In a supporting apparatus for the purpose set forth, a boring machine and a tubular work carrier of yoke-shaped form, means for adjustably suspending the carrier from its open end, centering annular means for the work mounted in the carrier, a work clamping means secured at its inner end to the other end of and extended from the carrier and including at its outer end a clamping plate adjustable relative to the carrier and a self-aligning work clamping plate interposed between the adjustable plate and the carrier and pivotally supported upon said adjustable plate, means for latching the carrier in adjusted position, said carrier being formed with an opening for the passage of the boring element of the machine, and said plates being formed with openings aligning with the opening in said carrier.

5. In a supporting apparatus for the purpose set forth, an upstanding open top base structure, spaced endwise aligning horizontally disposed shafts journaled in the upper end of said structure, a boring machine and tubular work carrier of yoke-shaped form depending into said structure and fixed at its open end to the inner ends of, bodily moving with and suspended from said shafts, work centering means mounted in the other end of the carrier, an adjustable and self-aligning work clamping means extended from the said other end of the carrier and coacting with said centering means for maintaining the work to be operated upon in stationary relation with respect to the carrier, means connected to one of said shafts for shifting the carrier with the machine and work attached thereto from a position within said structure to a position exteriorly thereof, and means for selectively latching the carrier in said positions.

6. In a supporting apparatus for the purpose set forth, a normally vertically disposed yoke-shaped suspended shiftable carrier common to a boring machine and tubular work to be operated upon, said carrier including a plate for carrying the machine and work respectively on opposite sides thereof, said plate having an opening for the passage of a boring element to act upon the work, a pair of rods fixedly anchored at one end to and extended from the plate, an adjustable clamping plate mounted on said rods, a self-aligning work clamping plate pivotally supported upon said adjustable plate, adjusters mounted on said rods for and abutting said adjustable plate, and a work centering means mounted in the plate of the carrier and coacting with said self-aligning plate for clamping the work with respect to the carrier to be operated upon.

7. In a supporting apparatus for the purpose set forth, a normally vertically disposed yoke-shaped suspended shiftable carrier common to a boring machine and tubular work to be operated upon, said carrier including a plate for carrying the machine and work respectively on opposite sides thereof, said plate having an opening for the passage of a boring element to act upon the work, a pair of rods fixedly anchored at one end to and extended from the plate, an adjustable clamping plate mounted on said rods, a self-aligning work clamping plate pivotally supported upon said adjustable plate, adjusters mounted on said rods for and abutting said adjustable plate, a work centering means mounted in the plate of the carrier and coacting with said self-aligning plate for clamping the work with respect to the carrier to be operated upon, means for shifting the carrier to and from a vertical position, and means for latching the carrier in vertical position and in its shifted position.

8. In a supporting apparatus for the purpose set forth, a base structure, a yoke-shaped suspended shifting carrier rotatably supported at its open end from the top of and depending into said structure, said carrier adapted to have anchored to its closed end a boring machine, tubular work centering and clamping means at and extended from the inner end of the carrier, means for suspending the carrier within and in a perpendicular position with respect to said structure, means for shifting the carrier from within said structure to a position above and at right angles to the latter, and means for selectively latching the carrier in said positions, said tubular work centering and clamping means including parts at its outer end substantially as described having provisions for adjusting it lengthwise with respect to the carrier to compensate for work of varying lengths, one of said parts being in the form of an internally stepped annular member for receiving one end of the work and another in the form of a latching device for said member.

9. In a supporting apparatus for the purpose set forth, a skeleton support open at its top and completely open at one side, a pair of spaced endwise opposed horizontal shafts journalled in the upper portion of said support, a yoke shaped carrier having the upper ends of its sides anchored to the inner ends of said shaft and including a bottom adapted to have a boring machine anchored to one face thereof, said bottom being adjustably connected to the lower ends of said sides and provided with an opening for the passage of a boring tool, annular centering means for the work mounted in said opening, and means for clamping the work to be operated upon against the other face of said bottom including an apertured clamping plate bodily adjustable towards and from said centering means and an annular self aligning work clamping plate pivoted upon the said other plate and opposing said centering means, the said self aligning plate being of less diameter than said adjustable clamping plate.

10. In a supporting apparatus for the purpose set forth, a skeleton support open at its top and completely open at one side, a pair of spaced endwise opposed horizontal shafts journalled in the upper portion of said support, a yoke shaped carrier having the upper ends of its sides anchored to the inner ends of said shaft and including a bottom adapted to have a boring machine anchored to one face thereof, said bottom being adjustably connected to the lower ends of said sides and provided with an opening for the passage of a boring tool, annular centering means for the work mounted in said opening, and means for clamping the work to be operated upon against the other face of said bottom including an apertured clamping plate bodily adjustable towards and from said centering means and an annular self aligning work clamping plate pivoted upon the said other plate and opposing said centering means, the said self aligning plate being of less diameter than said adjustable clamping plate, and said work clamping means including tubular adjusters for and extending through said adjustable clamping plate, said adjusters being formed with arresters to prevent the adjustable clamping plate shifting off the adjusters.

11. In a supporting apparatus for the purpose set forth, a skeleton supporting structure, a normally vertically disposed yoke-shape shiftable carrier positioned within and shiftable from said structure, means connected to one end of the carrier for pivotally connecting the latter to the top of said structure, said carrier adapted to have anchored to its other end a boring machine and formed with means for the passage of the tool of the machine, an adjustable clamping plate spaced from the said other end of the carrier, centering means for the work mounted in the said other end of the carrier, means extended from the said other end of the carrier for adjustably supporting said plate and for maintaining the latter in its adjusted position, a self-aligning plate for clamping the work against said inner end of the carrier, said self-aligning plate opposing, bodily carried by and pivoted to the inner face of said adjustable plate for clamping the work against said centering means, and manual shifting means for moving the carrier to and from its normal position, the said several means, plates and carrier being of aproximate balance to facilitate the manual shifting of the carrier from and to vertical position without the employment of a counterbalance.

THEODORE R. LOFLAND.